United States Patent
Hedu

[15] 3,677,570
[45] July 18, 1972

[54] DISPLAY DEVICE FOR NESTABLE TYPE SHOPPING CART

[72] Inventor: Jon Hedu, Watertown, Conn.
[73] Assignee: Actmedia, Inc., Westhampton Beach, N.Y.
[22] Filed: April 9, 1971
[21] Appl. No.: 132,775

[52] U.S. Cl. ...................................280/33.99 A, 40/308
[51] Int. Cl. ...........................................................G09f 3/18
[58] Field of Search ...................280/33.99 A, ; 40/308, 10 R

[56] References Cited

UNITED STATES PATENTS

| 2,845,729 | 8/1958 | Baumgart | 40/10 R |
| 3,024,554 | 3/1962 | Kempher | 40/308 |
| 3,088,236 | 5/1963 | Hendrick | 40/308 |
| 3,609,893 | 10/1971 | Routzahn et al. | 40/10 R |

FOREIGN PATENTS OR APPLICATIONS 1,553,969  12/1968  France................................280/33.99 A

*Primary Examiner*—Leo Friaglia
*Attorney*—Watson, Leavenworth & Kelton

[57] ABSTRACT

A display device for mounting on the vertical front wall part of a nestable type shopping cart, the display device having a pair of display panels carrying intelligence mounted on opposite faces of said front wall part for vertical sliding travel between a lowered retracted position and an upper extended display position. Biasing means normally maintain the device in extended display position. When a shopping cart is nested into a second like shopping cart, the upwardly swingable rear wall part of the second cart is engaged by camming structure on at least one display panel to swing said rear wall part upwardly and thereby apply downwardly directed force against said display device to vertically slide it to retracted position.

16 Claims, 6 Drawing Figures

Patented July 18, 1972
3,677,570
3 Sheets-Sheet 1
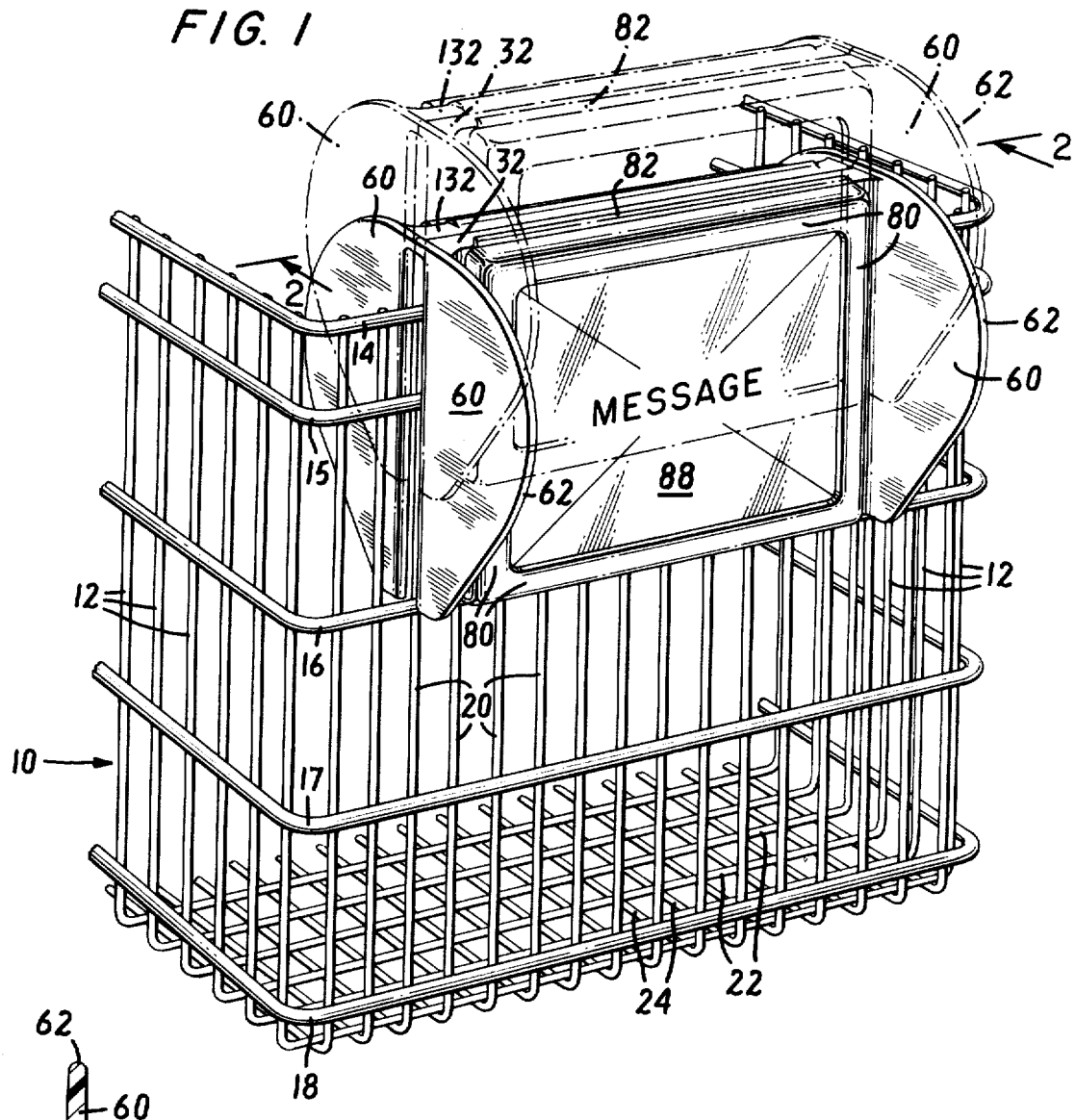
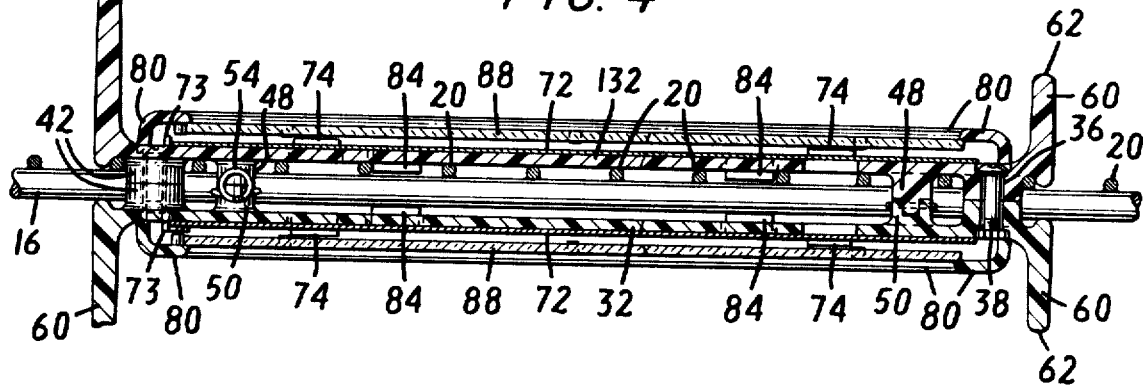

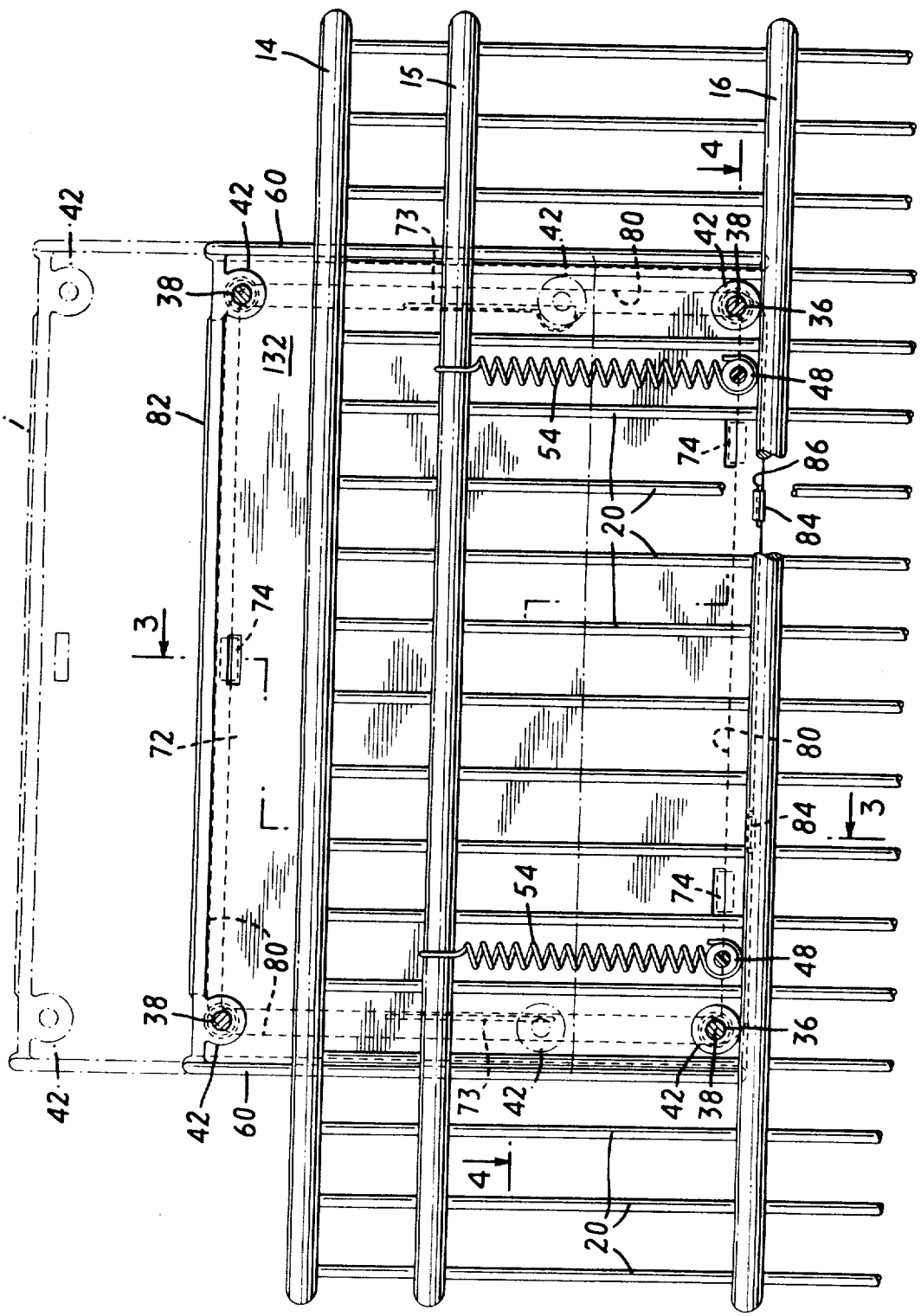

DISPLAY DEVICE FOR NESTABLE TYPE SHOPPING CART

BACKGROUND OF THE INVENTION

The present invention relates to a display device for a telescopingly nesting type shopping cart, the display device being characterized by being retractable from its normal display position for the purpose of nesting the shopping cart in a second like shopping cart. A display device of this character is disclosed in the Baumgart, U.S. Pat. No. 2,845,729. The display sign mounting disclosed in such patent is hinged at the top of the front end wall of a shopping cart basket or body and normally is maintained in upright display position by a number of torsion springs received on the journal rods provided as part of the sign mounting hinge assembly. When the shopping cart thus equipped with the sign mounting is nested through the rear of a second like shopping cart, the front end wall of the first cart swings the rear end gate or wall of the second cart upwardly to facilitate nesting entry of the first cart into the second with the sign mounting of the first cart being forced to pivot downwardly to retracted position, i.e., wherein such sign is disposed nearly horizontally and in underlying position beneath the rear end gate of the second cart.

While the display device disclosed in the Baumgart patent can function with effect for its intended purpose such display device is not satisfactory for the long term, rugged service life such devices should have, and which attributes of longevity, durability and ruggedness should be provided without need for maintenance or periodic repair of the display device. The Baumgart device being hinged at the top of the cart front end wall must of necessity if it is to possess reasonable display area, extend an undesirable height above the shopping cart tending to mask the frontal vision of a customer wheeling the shopping cart through a sometimes crowded shopping market. Because the Baumgart sign mounting is easily retracted from display position, it offers the disadvantage that a shopper leaning an arm against the sign mounting, a commonplace habit of shoppers waiting in line at a market checkout area, accidentally may be injured by the unexpected retraction of the mounting. Furthermore, the Baumgart device is designed to hold advertising cards therein in a manner which renders them too readily accessible so that such cards can be removed by children, mischievous adults or other persons thereby thwarting the purpose of having the sign mounting serve as an intelligence or advertising conveying medium.

Additionally, the Baumgart sign mounting being a hinged device is susceptible to damage to its hinging means in consequence of the action of nesting one cart within another with great force which may result in a misalignment of the hinged elements thereby preventing proper downward pivoting retraction of the sign mounting.

SUMMARY OF THE INVENTION

The present invention provides a display device for a telescopingly nesting type shopping cart which device provides optimum characteristics of ruggedness, durability, positive trouble free retracting of the device when its associated cart is nested in a like shopping cart, substantially tamperproof display, attractiveness of appearance and economy of manufacture, installation and maintenance.

In accordance with the present invention, the display device comprises a display panel which is mounted against the outer or leading face of the vertical front wall part of a shopping cart for vertical sliding travel on such front wall part. The display panel has spaced upper and lower margins and a relatively expansive face surface between such margins suitable for displaying intelligence in various forms such as product advertising, messages etc. The display panel is mounted on the front wall part for sliding travel between a lower retracted position in which the panel upper margin locates proximate the upper edge of the front wall part of the cart, and an upper extended or display position wherein the panel upper margin is located a distance above the front wall part upper edge. Biasing means provided as a tension spring connected at one end with the display panel and at the other end with the cart front wall part functions normally to hold said display panel in its extended position. The display panel also is provided with camming structure which followingly engages the body rear wall part of a second like shopping cart during nesting movement of a first cart into said second like shopping cart to swing such rear wall part upwardly to facilitate the nesting movement of the carts, such engagement applying force to the display panel in opposition to the biasing force of the tension spring and retracting the display to its lower position in which position the display device of the cart is maintained by the weight of the upwardly swung rear wall part of the second like shopping cart. The camming structure suitably is provided as at least one vertical plate connected with a lateral extremity of the display panel and having a convexly rounded edge extending away from the panel to facilitate achievement of smooth abutment and following engagement of the second like shopping cart rear wall part therewith during nesting insertion and removal of the first cart with the second.

The intelligence to be displayed with the device can be carried on a sheet and such sheet can be removably secured against the face surface of the display panel, securement means such as clips being provided on the display panel for that purpose. Furthermore, the display device can be provided with a window frame encircling marginal areas of the panel face and the intelligence 72 carried thereon, such window frame 80 being pivotally or swingably connected with the upper margin of the panel as at 82. For the purpose of securing the window frames 80 against the panel frames, the window frames are provided with latch projections 84 which can be removably received in notches 86 formed in the bottom margins of the panels. The window frames also are provided with plates 88 of transparent material which when the window frames are closed against the panel press against the intelligence carrying sheet 72. carrying sheet, the window frame being swingably connected to the display panel along the upper margin of the latter to swing said window frame away from the panel to open position for providing access to the sheet for removal and insertion thereof. The window frame is closeable against the sheet and panel and is provided for that purpose with a latch member latchable against a cooperating notch formed at the lower margin of the panel. This provides protection for the intelligence carrying sheet, the window frame preferably carries a plate of transparent material which covers the sheet when the window frame is closed.

In accordance with the present invention, the display device can comprise a second display panel disposed or mounted against the other or trailing face part of the cart body front wall part, the second display panel being connected with the first display panel to have unitary movement therewith. Advantageously, the second display panel is made substantially duplicate with the first, i.e., being provided with a window frame, intelligence sheet etc. When two display panels are employed with a shopping cart of the type having a lattice work body comprised of interconnected vertical and horizontal stringers, the two display panels can be connected together with a number of fasteners extending through the panels at laterally spaced locations adjacent the upper and lower margins of said panels with the fasteners extending between the vertical stringers. Furthermore, spacers can be used in cooperation with the fasteners and be positioned between the display panels to hold the latter spaced apart. Means can be provided in the panels to permit adjustment of the lateral spacing at which the fasteners pass therethrough for the purpose of mounting the panels on shopping carts having varying spacing distances between the vertical stringers in the cart front wall part. Additionally, the display panels can be provided with cooperating lug and socket means extending between the connected display panels, such lug and socket means serving as an attachment surface for receiving one end of the tension spring comprising the biasing means, with the other end of the tension spring being connected with an upper horizontal stringer of the cart front wall part.

The invention accordingly comprises the shopping cart display device possessing the features, properties and relation of elements which will be exemplified in the devices hereinafter described and the scope of the present invention will be indicated in the claims.

BRIEF DESCRIPTION OF THE DRAWINGS

Other objects of the invention will be in part obvious and will in part appear from the following detailed description taken in conjunction with the accompanying drawings, wherein like reference numerals identify like parts throughout and in which:

FIG. 1 is a perspective view of the shopping cart display device of the present invention, the device comprising a pair of display panels mounted, respectively, on the leading and trailing faces of the vertical front wall part of a nestable type shopping cart having a body formed as a lattice work of interconnected horizontal and vertical wires on stringers, only a front portion of said body being depicted with the display panels being shown in retracted lowered position in solid lines and upper on extended position in phantom lines.

FIG. 2 is a fragmentary front elevational view on enlarged scale of the shopping cart front wall part, the display panel mounted on the leading face of such front wall part being removed to clearly depict the manner of mounting the display panels and biasing spring in the front wall part.

FIG. 4 is a horizontal sectional view of the display device as taken along the stepped down cutting line 4—4 in FIG. 2, the window frame of the display panel mounted at the trailing face of the body front wall part being shown in solid lines in closed position and in phantom lines in partly open position.

DESCRIPTION OF THE PREFERRED EMBODIMENTS

Figure 3:
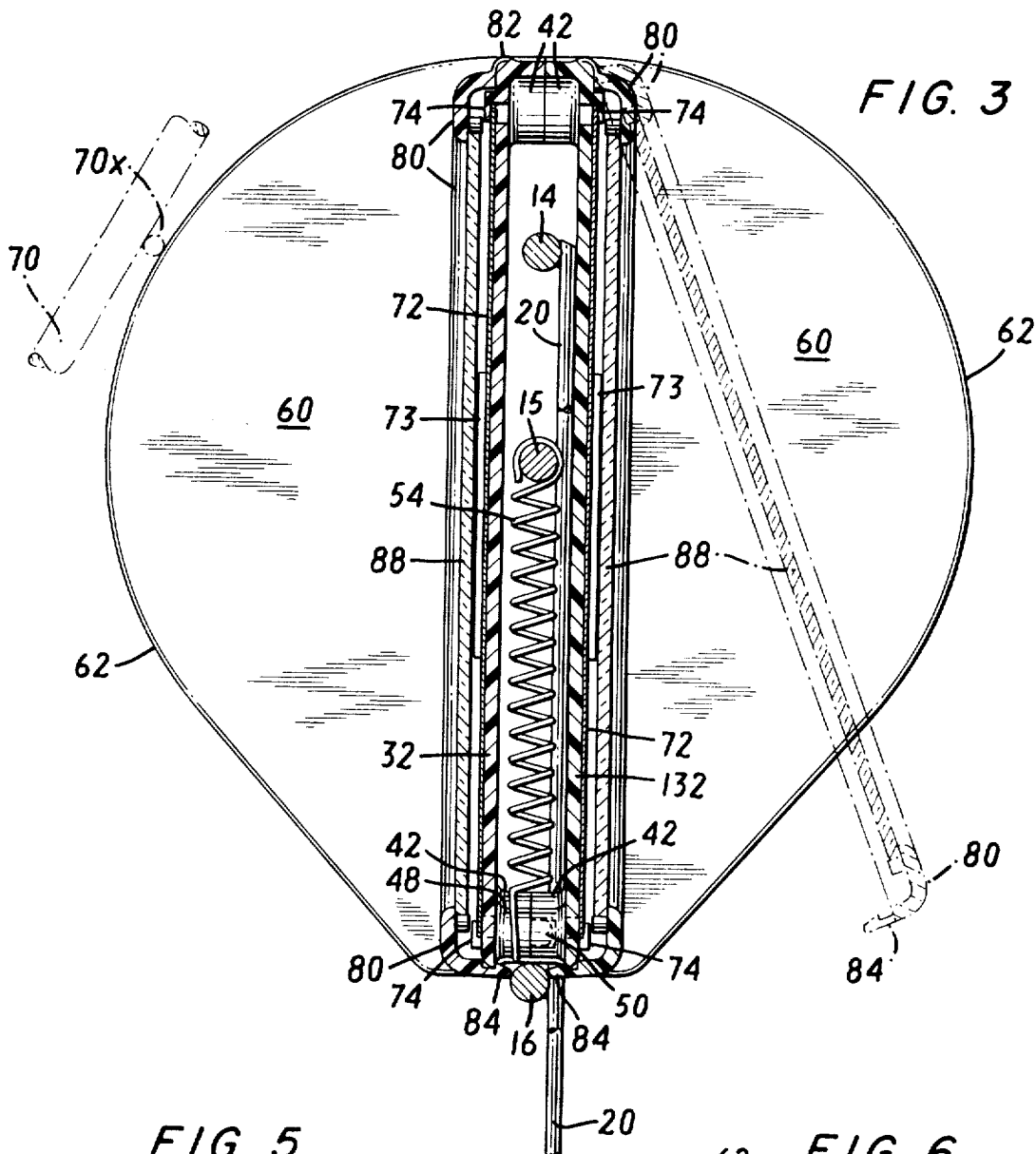
FIG. 3 is a side elevational view in section of the display device as taken along the line 3—3 in FIG. 2.

The present invention is concerned with a display device for telescopingly nestable type shopping carts in which the body of the cart can be nested in that of a second like shopping cart. Constructional features and mode of nesting of such carts is well known to those skilled in the art and is described in the aforementioned Baumgart patent and in such respect and for which purpose, the disclosure of the Baumgart patent is incorporated herein by reference.

Referring now to FIG. 1, there is depicted a front end portion of a nestable type shopping cart 10. Such shopping cart comprises a lattice work of the interconnected horizontal and vertical stringers of enclosing wall structure which defines the shopping cart body. Thus the body 10 has side wall parts defined by a series of vertical stringers 12 and horizontal stringers 14–18 at both sides. Similarly, the horizontal stringers 14–18 along with a series of vertical stringers 20 define a vertical front wall part of the cart body, the front wall part having a leading face at the side where the horizontal stringers are located, and a trailing face at the opposite side. The cart body also includes a bottom provided by cross connected series of stringer members 22, 24. As is well known, the aforementioned can be metal and be connected together by welding to produce the body structure, the upper edge of which is defined by horizontal stringer 14.

Mounted on the front wall part of the cart body is display device 30 intended to carrying intelligence. "Intelligence" is intended to mean any form of writing illustration employed to convey a message, idea, stimulus etc. The display device 30 comprises a display panel 32 disposed at the leading face of the front wall part, and preferably a second display panel 132 disposed at the trailing face of the front wall part. Each of the panels 32, 132 is provided with spaced upper and lower margins and a relatively broad expansive face extending between the margins for displaying intelligence. The display panels 32, 132 are mounted on the front wall part of the cart for vertical sliding travel thereon, the panels being connected together in the manner as will appear to provide unitary sliding travel thereof. The vertical sliding movement of the display panels 30, 132 is intended to be between the lower retracted solid line position shown in FIG. 1 wherein the upper margins of the display panels are located proximate the upper edge of the cart body front wall part, and an upper or extended display position depicted in phantom lines wherein the panel upper margins are located spaced a distance above such cart body front wall part upper edge. The manner of connecting the display panels 32, 132 together and mounting them on the front wall part can be discerned with reference to FIGS. 2–4.

Each of the panels 32, 132 is provided adjacent its upper and lower margins with a number of openings 36 through which can be received suitable fasteners 38, e.g., nuts and bolts for holding the panels secured together, the fasteners 38 extending through the spaces in the front wall part between the stringer 20. Cooperating with the fasteners 38 are spacing means on each panel which can be provided as projecting boss-like elements 42 on each panel and having passages therein forming extensions of the openings 36, the arrangement being such that each element 42 of one panel is in registering abutment with an element 42 on the other panel when the panels are connected together in back-to-back relation, the bosses or elements 42 serving thus to maintain the connected panels parallel spaced. The elements 42 can be tubular spacer pieces or they may be made integral with the panels. The panels 32, 132 also can be provided adjacent their lower margins and laterally inset from the location of the fastener 38 with a number of lugs 48 and sockets 50 formed at the inner or confronting face of the panels, the lugs 48 of one panel engaging in the sockets 50 of the other panel to provide additional spacing means between the panels as well as to serve as spring anchorage means as will be described below.

When a shopping cart equipped with a display device 10 is not nested inside another like cart, the display device normally is maintained in its upward extended display position by biasing means preferably provided in the form of one or more coil type tension springs 54. The tension springs as can be best seen in FIGS. 2 and 3 are at one end connected or secured around the cooperating lugs 48 and sockets 50 and extend upwardly at their other ends to connection with a horizontal stringer 15 being secured around the latter as shown in FIG. 3, the extended position of the panels being shown in phantom lines in FIG. 2. The retracted position of the panels is shown in solid lines in FIGS. 2 and 3 and in which position, the springs 54 are tensed under the impetus of downwardly applied force acting on the panels and produced by the weight of the rear end wall part of a cart in which the device carrying cart is nested.

In order to effect retraction of the panels 32, 132 during nesting movement of one cart into a second like cart, at least the panel 32 mounted at the leading face of the cart front wall part is provided with camming structure to effect such purpose. The camming structure is provided as at least one vertical plate 60 connected with a lateral extremity of the panel 32 and extending outwardly therefrom away from the front wall part leading face. Preferably, a second vertical plate 60 is provided at the other lateral extremity of panel 32 and such plates desirably are formed integral with the panel structure. The other panel 132 also may be provided with vertical plates 60 to provide an enhanced symmetrical appearance of the device. The vertical plates 60 each have an edge surface 62 extending outwardly of the panel between its upper and lower margins, the edge surface following a substantially convexly rounded path along a major course of its length between such margins and defining a camming surface which followingly engages the rear end wall part of a second cart into which a cart carrying the device is being nested, such engagement serving to swing the second cart rear wall part inwardly and upwardly and also to apply downwardly directed force to the display panels in opposition to the biasing force of springs 54 and causing retraction of the panels. The character of such following engagement of the camming surface 62 of the vertical plates can be noted from FIG. 3 where a phantom portion of the rear end wall part is depicted in phantom detail 70, such depiction representing the inclination at which such rear wall part is normally inclined when the first cart makes contact therewith during nesting movement.

For the purpose of mounting intelligence carrying sheets 72 or sheets embodying a message means 73 at the broad face of the panels 32, 132, the latter can be provided with a number of clips 74 which each have a tongue-like part spaced outwardly of the panel surfaces behind which the sheets 72 can be removably received to hold same securely on the device. A number of such clips 74 can be provided on each panel adjacent the upper and lower margins thereof as shown in FIGS. 2 and 3.

To prevent tampering with the intelligence carrying sheets and to protect the same from the weather and other causes of wear and tear, each panel 32, 132 is provided with a hollow rectangular window frame 80 receivable against marginal areas of each panel broad face surface and the sheets 72 carried thereon, such window frame 80 being pivotally or swingably connected with the upper margin of the panel as at 82. For the purpose of securing the window frames 80 against the panel frames, the window frames are provided with latch projections 84 which can be removably received in notches 86 formed in the bottom margins of the panels. The window frames also are provided with plates 88 of transparent material which when the window frames are closed against the panel press against the intelligence carrying sheet 72.

Figure 5:
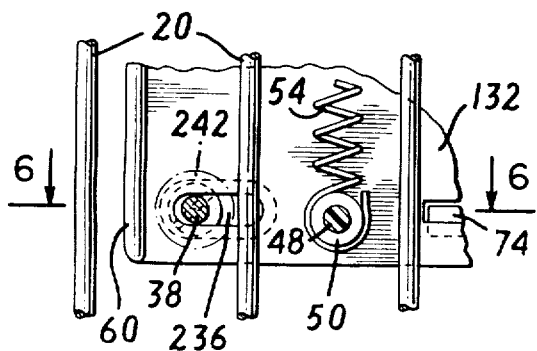
FIG. 5 is a fragmentary plan view of a lower corner of the display device depicting the manner in which elongated openings are provided in the display panels to allow for lateral adjustment of the fasteners with which the panels are connected together.
Figure 6:
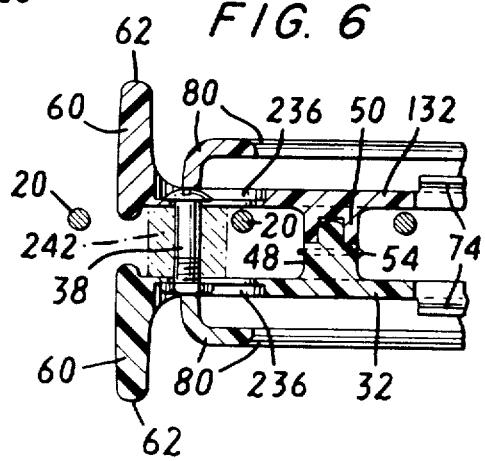
FIG. 6 is a horizontal sectional view as taken along the line 6—6 in FIG. 5.

As is known, different manufacturers of lattice work type shopping carts vary the lateral spacing between the vertical stringers 20. Accordingly, to adapt the display device of the present invention for installation on the carts of different manufacturers, and if it is necessary in order to fasten the panels 30, 132 to the formed wall part of a cart, the panels can be provided with means to laterally adjust the locations at which the fasteners connecting the panels pass through the latter. For this purpose, the panels can be modified in the manner shown in FIGS. 5 and 6 in which the openings 236 in the panels are elongated so that the fasteners 38 can be received through a space between adjacent ones of the stringers 20. Since the openings 236 are elongated, it is desirable to not form the spacer 242 integral therewith but rather to provide such spacers as separate tubular components. Thus, the panel so modified can be installed on almost all lattice work type carts presently made.

The display device of the present invention can be made from various materials and in different ways. However, a particularly advantageous and preferable form of the display device is made of polypropylene. In the latter instance, the panels 32, 132 are made identically in all respects. Furthermore, the window frame 80 is made integral with the panel, being joined to the upper margin thereof by means of a living hinge formed at 82.

Those skilled in the art will readily appreciate the manner in which the display device of the present invention functions and particularly the manner in which it is retracted when the cart on which it is mounted is nested in a second like shopping cart. As was mentioned earlier and as depicted in FIG. 3, the vertical plate 60 on the panel 32 at the leading face of the cart front wall part when the latter is being nested in a second cart, will strike the swingable rear wall part of such second cart and pivot it upwardly, the camming edge 62 of the vertical plate following the swinging rear wall part 70 in contract therewith. Usually the latter engagement will involve the riding upwardly along the camming edge 62 of a cross member or horizontal string in 70x on the second cart real wall part. Such cross member 70x will ride all the way up to the top of the device causing the display device to retract downwardly to its fully retracted position with the rear end wall part laying on top of it. Similarly, when removing a nested cart from a second cart, the cross member 70x on the rear wall part will ride down the camming edge 62 until the cart carrying the display device is clear of the downwardly swinging rear wall part of the cart from which it was withdrawn, at which time the display device will be extended upwardly by the springs 54 to full display position.

It will be apparent from a reading of the foregoing that the display device of the present invention is suited for use on a wide range of nestable type shopping carts, is is attractive in appearance and sufficiently rugged to withstand the repeated retractions and extensions thereof attendant with its use in supermarkets and like establishments.

What is claimed is:

1. In a telescopingly nesting type shopping cart having a cart body comprising encircling wall structure defining the cart body and including a vertical front wall part having an upper edge and leading and trailing faces, and a rear wall part mounted for swinging movement inwardly and upwardly of the cart body, the body of said shopping cart being telescopingly nestably receivable in the cart body of a second like shopping cart through the rear of the latter with the body rear wall part of said second like shopping cart being swung inwardly and upwardly by engagement of the body front wall part of the first shopping cart therewith during nesting movement of the latter into the former, a display device comprising a display panel having upper and lower margins and space therebetween for displaying intelligence, means for mounting said display panel on said cart body front wall part against one face thereof for vertical sliding travel thereon between a lower retracted position wherein the panel upper margin is located proximate the upper edge of said front wall part and an upper extended position wherein said panel upper margin is located distant from the upper edge of said front wall part, means for normally biasing said display panel into its extended position, and retracting means operable in opposition to said biasing means during the nesting movement of said cart into a like second cart for sliding said display panel from its extended position to its retracted position.

2. The display device of claim 1 wherein said display panel is mounted against the leading face of said front wall part and wherein said retracting means comprises camming structure embodied in said display panel extending outwardly therefrom and away from the leading face of said front wall part, said camming structure including a camming surface followingly engageable with the body rear wall part of said second like shopping cart during the nesting movement of the first cart into said second like cart and being effective during such following engagement to swing the body rear wall of said like second cart inwardly and upwardly, such engagement applying force to said display panel in opposition to said biasing means.

3. The display device of claim 2 wherein said camming structure comprises at least one vertical plate connected with at least one lateral extremity of said display panel, said plate having an edge surface defining said camming surface extending outwardly of said display panel from the upper and lower margins of said display panel.

4. The display device of claim 3 wherein the edge surface of said vertical plate is substantially convexly rounded along a major course of its length.

5. The display device of claim 1 wherein said biasing means comprises at least one spring connected with the body front wall part and engaging said display panel to apply biasing force thereto.

6. The display device of claim 5 wherein said spring is a tension spring.

7. The display device of claim 1 wherein said display panel is provided with a relatively broad expansive face, a sheet carrying intelligence for display, and means for removably securing said sheet against the face of said panel.

8. The display device of claim 7 wherein the means for removably securing said sheet against the face of said panel comprises clips fixed to said face, said clips having tongue-like parts spaced from said face, said sheet being removably receivable between said tongue-like parts and said face for securing said sheet on said panel.

9. The display device of claim 8 further comprising a window frame encircling marginal areas of the face of said panel and the intelligence carrying sheet secured thereagainst said window frame being swingably connected to the upper margin of said panel to permit swinging said window frame away from said panel to permit access to said sheet, said window frame having latching means for removably latching it in closed position against said panel face, said latching means including a latching clip engageable with a latching notch in the bottom margin of said panel.

10. The display device of claim 9 further comprising a plate of transparent material carried in said window frame.

11. The display device of claim 1 further comprising a second display panel mounted on said cart body front wall part against the trailing face thereof, and means connecting said second display panel with the first-mentioned display panel for unitary sliding travel therewith, said second display panel having upper and lower margins and space therebetween for displaying intelligence.

12. The display device of claim 11 as embodied in a nesting type shopping cart in which the vertical front wall part of the cart body is comprised of interconnected, spaced apart horizontal and vertical stringers, the means connecting said second display panel with the first-mentioned display panel comprising fasteners extending through both display panels at a number of laterally spaced locations therein adjacent the upper and lower margins of said panels, and spacer members cooperating with said fasteners for maintaining said display panels in substantially parallel spaced relation.

13. The display device of claim 12 wherein said biasing means comprises at least one tension spring connected at one end with both of said display panels at a common location adjacent the bottom margins of said panels and defined by engaging cooperating lug and socket means extending between said display panels, said spring being connected at its other end with a horizontal stringer of said body front wall part.

14. The display device of claim 13 wherein said spacer members have passages extending therethrough which cooperate with openings formed in said display panels for receiving said fasteners.

15. The display device of claim 14 wherein said spacer members are formed as boss-like projections on said display panels at opposing locations adjacent the upper and lower margins of said display panels, the boss-like projection on one display panel registrably abutting with those on the other display panel when said panels are connected together.

16. The display device of claim 14 wherein the openings in said display panels which receive said fasteners are laterally elongated to permit adjustment of the lateral spacing at which said fasteners are received through said display panels.

* * * * *

UNITED STATES PATENT OFFICE
CERTIFICATE OF CORRECTION

Patent No. 3,677,570    Dated August 29, 1972

Inventor(s) Jon Hedu

It is certified that error appears in the above-identified patent and that said Letters Patent are hereby corrected as shown below:

Column 2, line 27 should read --face and the intelligence--. Column 2, delete lines 28 thru 36 inclusive. Column 2, line 36 should read -- carrying sheet, the window frame --.

Signed and sealed this 20th day of March 1973.

(SEAL)
Attest:

EDWARD M. FLETCHER, JR.　　　　ROBERT GOTTSCHALK
Attesting Officer　　　　　　　　Commissioner of Patents